United States Patent [19]

Jeong

[11] Patent Number: 5,785,429
[45] Date of Patent: Jul. 28, 1998

[54] SINTERED OILLESS BEARING

[75] Inventor: Dae Hyun Jeong, Kyunggi-do, Rep. of Korea

[73] Assignee: Samsung Electro-Mechanics Co., Ltd., Suwon, Rep. of Korea

[21] Appl. No.: 838,642

[22] Filed: Apr. 9, 1997

[30] Foreign Application Priority Data

Aug. 19, 1996 [KR] Rep. of Korea ............... 96-34169

[51] Int. Cl.$^6$ ........................................ F16C 17/02
[52] U.S. Cl. ..................... 384/397; 384/279; 384/902
[58] Field of Search .......................... 384/279, 902, 384/114, 397, 401, 408

[56] References Cited

U.S. PATENT DOCUMENTS

| | | | |
|---|---|---|---|
| 5,372,433 | 12/1994 | Nakanishi et al. | 384/279 |
| 5,433,532 | 7/1995 | Kawageo et al. | 384/279 |
| 5,474,386 | 12/1995 | Komatsu | 384/279 |
| 5,490,730 | 2/1996 | Akita et al. | 384/279 |

*Primary Examiner*—Lenard A. Footland
*Attorney, Agent, or Firm*—Ladas & Parry

[57] ABSTRACT

A sintered oilless kinetic pressure bearing containing an oil is formed with a plurality of grooves along the inner diameter to produce the kinetic pressure, in which the proportion between the groove and corresponding inner periphery portion is appropriately maintained according to the Reynolds equation for decreasing initial abrasion and heightening durability to lengthen the life while a pressure is induced throughout the inner periphery for providing a stiffness coefficient impervious to a great impact or high load imposed by an external force and heightening stability in the rotating motion. The bearing in a cylindrical sintered oilless bearing includes a plurality of grooves along the inner periphery plane thereof in the lengthwise direction of a shaft such that an interval between the grooves become respective inner periphery portions and the groove and inner periphery portion are partitioned by side planes. Thus, assuming that an angle range of the groove is denoted by $\alpha$ and an angle range of the inner periphery portion is by $\beta$.

10 Claims, 4 Drawing Sheets

SINTERED OILLESS BEARING

BACKGROUND OF THE INVENTION

1. Field of the Invention

The present invention relates to a sintered oilless bearing containing oil, and more particularly to a kinetic pressure bearing for generating a kinetic pressure by forming a plurality of grooves along the inner periphery thereof.

2. Description of the Prior Art

A sintered oilless bearing, as shown in FIG. 1, generally refers to a metallic material bearing containing oil which is retained after a powder is subjected to a compression molding. Once a rotating shaft a is rotated at the inner diameter, the oil contained within a pore of the bearing is forcibly pushed out via a clearance c by a temperature rise of bearing b and a pressure produced to clearance c resulting from an initial abrasion to form an oil film between rotating shaft a and the inner diameter of bearing b, thereby making it possible to perform a slidable rotation.

In such a common sintered oilless bearing, however, the oil is not pushed out during the initial rotating motion which creates severe initial abrasion. In addition to this, because the pressure is produced unevenly at only the narrow clearance the results are significantly increased shaking and vibration of the rotating shaft, and a stiffness coefficient that measures endurance against external force is low.

Therefore, currently, a plurality of grooves are repeatedly formed along the inner periphery of the sintered oilless bearing to generate a kinetic pressure, thereby enhancing durability and rotation stability.

However, without maintaining the most effective proportion with respect to an interval of the grooves, i.e., a width between the projection and groove, the above-described sintered oilless kinetic pressure bearing is less effective in reducing the initial abrasion rate and heightening durability and stiffness coefficient. U.S. Pat. No. 5,129,738 may be one example of the prior invention.

In more detail, as shown in FIG. 2, the bearing according to the above U.S. patent is provided by forming a projection e having an angle range of 30°~70° and at least 30°~50° at the inner diameter for generating the oil kinetic pressure effect. When the angle range of projection e and an angle range of a groove f between projections e are interpreted by means of the Reynolds equation, they do not have a desirable proportion.

This is because the angle of projection e is solely defined without regard to the proportion between projection e and groove f. Accordingly, if the inner diameter dimension and the number of grooves of the bearing are changed, the projection in some cases may become excessively wider than the groove as shown in FIG. 2, and in other cases the groove may become excessively wider than the projection so that the bearings according to the prior art are unable to obtain a preferable kinetic pressure effect. Moreover, even though many bearings have an inner diameter of smaller than several millimeters, they are manufactured to have six or more grooves.

SUMMARY OF THE INVENTION

The present invention is devised to solve the foregoing problems. Therefore, it is an object of the present invention to provide a cylindrical sintered oilless bearing for generating a kinetic pressure by forming a plurality of grooves along the inner diameter thereof, wherein the proportion between the groove and corresponding inner periphery portion is appropriately maintained in accordance with the Reynolds equation for decreasing initial abrasion and increasing durability to lengthen the life while pressure is induced throughout the inner periphery for providing a stiffness coefficient impervious to a great impact or high load imposed by an external force and heightening stability in the rotating motion.

To achieve the above object of the present invention, a cylindrical sintered oilless kinetic pressure bearing is formed with a plurality of grooves along the inner periphery plane in the lengthwise direction of the shaft, in which intervals between the grooves become respective inner periphery portions and the groove and inner periphery portion are partitioned by side planes. Thus, assuming that an angle range of the groove is denoted by $\alpha$ and that of the inner periphery plane is denoted by $\beta$, $\alpha$ and $\beta$ have an appropriate proportion.

BRIEF DESCRIPTION OF THE DRAWINGS

The above objects and other advantages of the present invention will become more apparent by describing in detail preferred embodiments thereof with reference to the attached drawings in which.

DETAILED DESCRIPTION OF THE PREFERRED EMBODIMENTS

Figure 1:
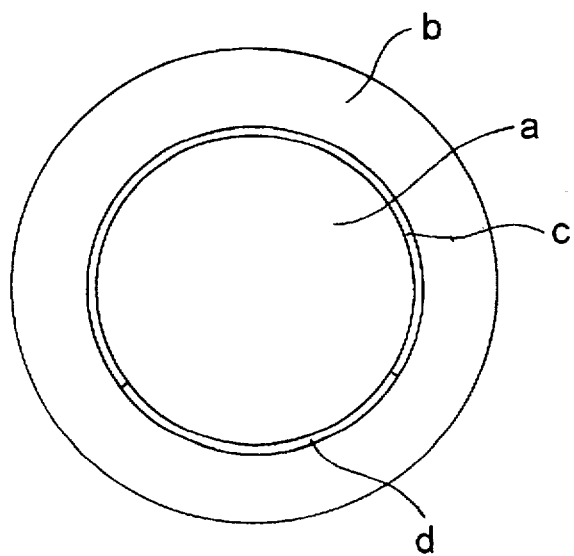
FIG. 1 is a plan sectional view showing a conventional sintered oilless bearing.
Figure 2:
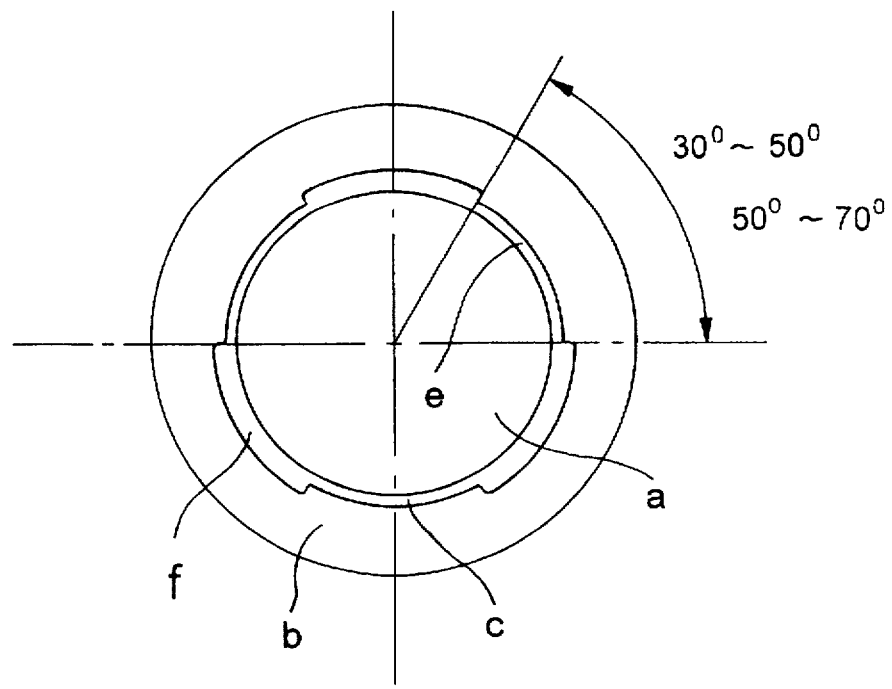
FIG. 2 is a plain sectional view showing a sintered kinetic bearing according to a prior invention.
Figure 3:
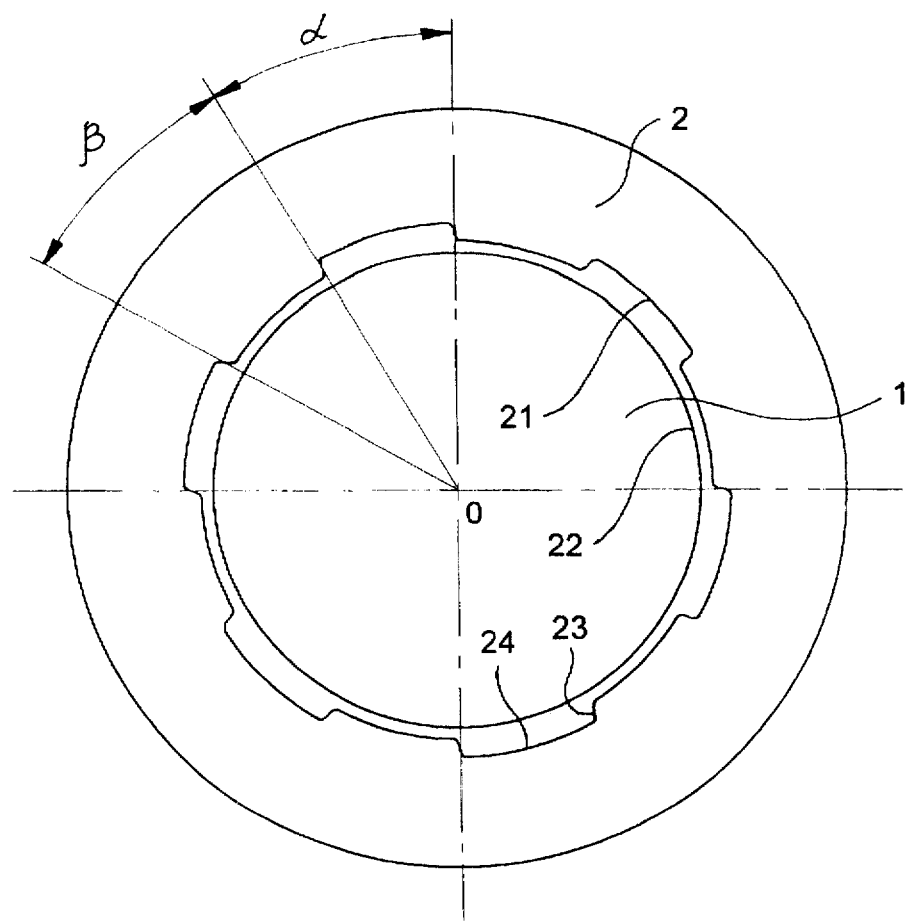
FIG. 3 is a plan sectional view showing a sintered kinetic bearing according to the present invention.

FIG. 3 is a plan sectional view showing one preferred embodiment of a sintered oilless bearing according to the present invention, which illustrates a cylindrical bearing 2 and a rotating shaft 1 fitted into the inside of cylindrical bearing 2. A plurality of grooves are formed along the inner periphery of bearing 2 in the lengthwise direction of the shaft. Also, due to the grooves 21, the inner periphery portions(projections) 22 disposed between the grooves 21 have a relatively high depth.

Groove 21 has a bottom portion 24, and both sides of bottom portion 24 is formed by side planes 23. When the center o of cylindrical bearing 2 is set as a reference, an angle range provided by the width of groove 21 is to be denoted by $\alpha$, an angle range of inner periphery 22 is $\beta$ and the number of each is n since they are equal in number.

Consequently, $\alpha+\beta=360°/n$. For example, if the number of grooves 21 is six as shown in FIG. 3, $\alpha+\beta=60°$.

In the present invention, it is most important that the proportion between α and β is appropriately set in the above equation that α+β=360°/n, and the corresponding value satisfies:

$$\frac{\alpha}{\alpha + \beta} = 0.56\text{--}0.78$$

The embodiments of α and β according to the above proportional expression and the value n are written as the following table 1.

TABLE 1

| n | 360°/n | Case of α + β × 0.56<br>Case of α + β × 0.78 | Proportion of angle range (α:β) |
|---|---|---|---|
| 3 | 120° | 120° × 0.56 = 67°<br>120° × 0.78 = 94° | 67°:53°<br>94°:26° |
| 4 | 90° | 90° × 0.56 = 50°<br>90° × 0.78 = 70° | 50°:40°<br>70°:20° |
| 6 | 60° | 60° × 0.56 = 34°<br>60° × 0.78 = 47° | 34°:26°<br>47°:13° |
| 8 | 45° | 45° × 0.56 = 25°<br>45° × 0.78 = 35° | 25°:19°<br>35°:10° |
| 10 | 36° | 36° × 0.56 = 20°<br>36° × 0.78 = 28° | 20°:16°<br>28°:8° |
| 12 | 30° | 30° × 0.56 = 17°<br>30° × 0.78 = 23° | 17°:13°<br>23°:7° |

For example, if the number of grooves is six when being used for a product of which the diameter of the rotating shaft is 4 mm and rpm is approximately 10000~15000, and since α+β=360°/n, α+β becomes 60° as can be noted in the above table.

Also, providing that the value of $$\frac{\alpha}{\alpha + \beta}$$

is 0.6 which is in the range of 0.56~0.78, the angle range of α is 36° (60°×0.6), and the angle range of β is the remaining 24°. Accordingly, the angle range of groove 21 and inner periphery portion 22 is to be set as 36°:24°.

In the above angle range, by way of suggestion, it is preferable that the appropriate depth of groove 21 is approximately 2.5 μm and the appropriate clearance between the inner diameter of the bearing and the outer diameter of the rotating shaft is 2 μm~3.5 μm.

Figure 4A:
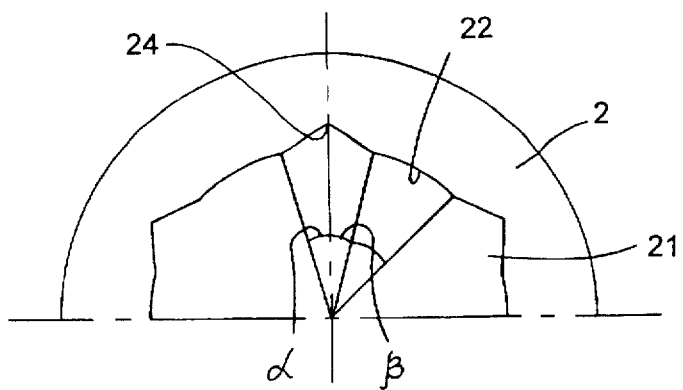
FIGS. 4A–4C are plan sectional views showing respective embodiments of molding the grooves according to the present invention.
Figure 4B:
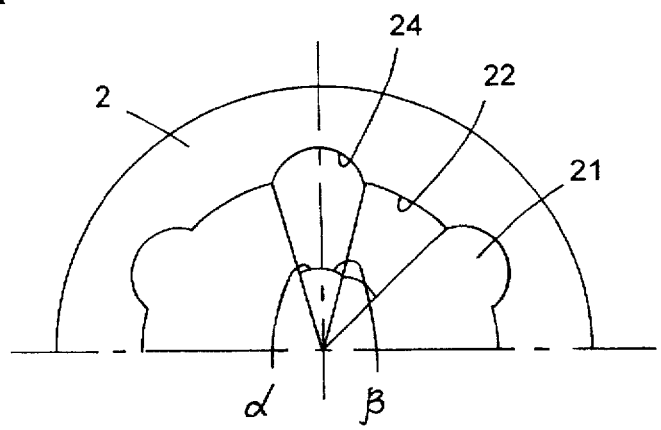
Figure 4C:
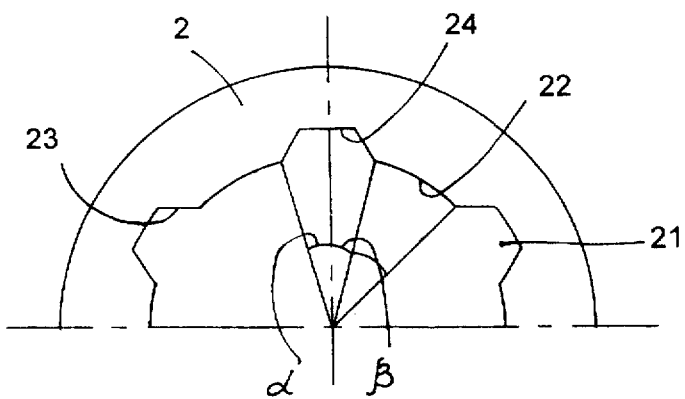

On the other hand, the shape of groove 21 may be embodied by different forms as shown in FIGS. 4A, 4B and 4C.

In other words, referring to FIG. 4A, groove 21 is formed such that the bottom thereof is provided as a V-shaped bottom 24 with a deep center without including side planes while forming an angle at both sides. In FIG. 4B, the bottom of groove 21 is formed as a semicircular bottom 24 with a deep center but there are no side planes. In FIG. 4C, side planes 23 of groove 21 respectively meet at the bottom and inner periphery portion by forming an obtuse angle to have a trapezoidal shape.

The operational effect of the present invention constructed as above will be described hereinbelow.

First, the experiment carried out by this applicant for obtaining the above values brings about a result as the following table 2.

TABLE 2

| | Model 1 (prior invention) | Model 2 | Model 3 |
|---|---|---|---|
| α + β | 5:5 | 6:4 | 5.5:4.5 |
| Load capacity | 13.05 | 24.14 (85% ↑) | 16.25 (25% ↑) |
| Temperature rise | 18.15 | 16.91 (7% ↓) | 17.70 (3% ↓) |
| Stiffness coefficient | 4.4E5 | 3.2E6 (72% ↑) | 7.0E5 (59% ↑) |
| Groove number = 6 | 30°:30° | 36°:24° | 33°:27° |

When analyzing the three models as is represented in the above table, it can be noted that the model no. 2 exhibits distinguishably superior bearing performance over other models with respect to the load capacity and stiffness coefficient while having the temperature rise feature that is rather low.

The shape of groove 21 may be differently formed, as shown in FIGS. 4A, 4B and 4C, in accordance with the shape of a mold or of a sizing bar for performing sizing, which is for enhancing productivity or most effectively inciting the kinetic pressure. Those shown in FIGS. 4A and 4B have the advantage of being easily fabricated, while that shown in FIG. 4C affords a more excellent effect. The shape should be considered in the stage of designing.

Figure 5:
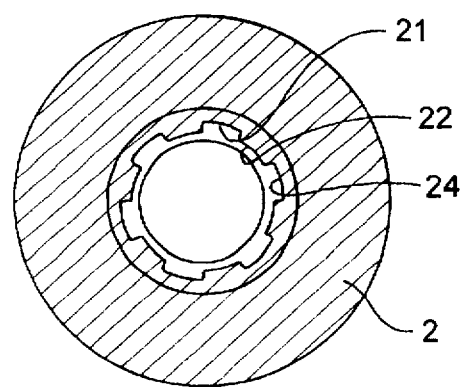
FIGS. 5 and 7 are plan sectional views and FIG. 6 is a longitudinal sectional view showing an embodiment having differing cylindrical portions according to the present invention.
Figure 6:
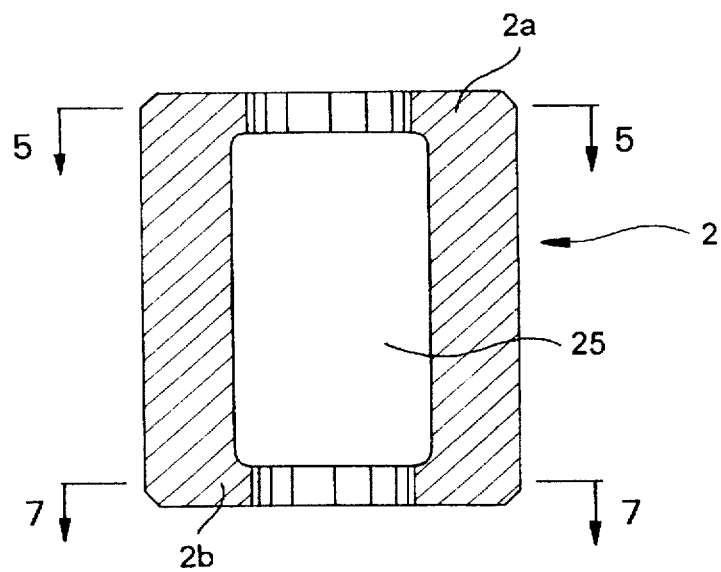
Figure 7:
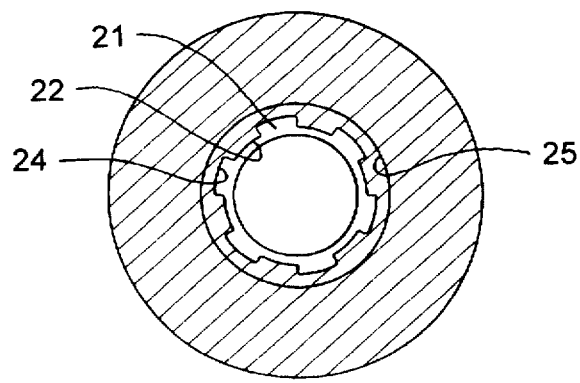

In addition, the bearing according to the present invention may be differently shaped as shown in FIGS. 5, 6, and 7.

Here, bearing 2 is cylindrically formed, in which a center portion 25 is extended to restrictively form groove 21 and inner periphery portion 22 only to at an upper-half portion 2a and a lower-half portion 2b.

This is for, in using the bearing as a shaft stand, obtaining an effect of a vertically-separated type bearing even without using the vertically-separated type bearing but actually by using a united kinetic pressure bearing. In this embodiment, it is more effective when the groove position of upper-half portion 2a and the groove position of lower-half portion 2b are alternately provided as shown in FIGS. 5 and 7 at sections V—V and VII—VII shown in FIG. 6. In other words, in the lengthwise direction a groove 21 is formed in the upper half portion 2a while in the corresponding position in the lower half portion 2b, a projection or inner periphery portion 22 is formed, and rise versa. Preferably, the number of grooves is approximately more than five.

As described above in detail, in fabricating the sintered kinetic bearing according to the present invention, the angle range between groove 21 for generating the kinetic pressure and inner periphery portion 22 in contact with the rotating shaft is to maintain the proportion appropriate to the Reynolds equation, i.e., stable proportion, regardless of changing the number of groove 21 when molding it. Therefore, the operation and effect as the bearing can be distinguishably exerted by the excellent load capacity and stiffness coefficient and the decreased temperature rise.

While the present invention has been particularly shown and described with reference to particular embodiment thereof, it will be understood by those skilled in the art that various changes in form and details may be effected therein without departing from the spirit and scope of the invention as defined by the appended claims.

What is claimed is:

1. A sintered oilless bearing in a cylindrical sintered oilless bearing comprising a plurality of grooves along the inner periphery plane thereof in the lengthwise direction of a shaft, a plurality of inner peripheral portions each having an interval between two adjacent grooves, and said grooves and inner periphery portions are partitioned by side planes, whereby the following expression is satisfied:

$$\frac{\alpha}{\alpha+\beta} = 0.56\text{--}0.78$$

where an angle of said groove is denoted by $\alpha$, that of said inner periphery portion corresponding to said interval between said two adjacent grooves is denoted by $\beta$.

2. A sintered oilless bearing as claimed in claim 1, wherein a bottom of said groove is formed as a circular arc having the center identical to the center of the cylindrical bearing, and said side planes between said groove and inner periphery portion are to meet with said bottom of said groove and inner periphery plane, respectively.

3. A sintered oilless bearing as claimed in claim 1, wherein said bottom of said groove is formed to have a V-shape with the deep center while forming an angle without involving side planes.

4. A sintered oilless bearing as claimed in claim 1, wherein said bottom of said groove is formed to have a semicircular bottom with the deep center while involving no side planes.

5. A sintered oilless bearing as claimed in claim 1, wherein said groove has said side planes respectively meeting with said bottom and inner periphery plane forming an obtuse angle to provide a trapezoidal groove shape.

6. A sintered oilless bearing as claimed in claim 1, wherein:

$\alpha+\beta=360°/n$ where n represents the number of grooves and is greater than or equal to 6.

7. A sintered oilless bearing in a cylindrical sintered oilless bearing comprising a plurality of grooves along the inner periphery plane thereof in the lengthwise direction of a shaft, wherein, an angle of each groove is denoted by $\alpha$ and that of an inner periphery portion corresponding to an interval between two adjacent grooves is denoted by $\beta$, the equation $$\frac{\alpha}{\alpha+\beta} = 0.56\text{--}0.78$$

is satisfied, and the hollow portion of said inner periphery portion is extended to be wider than a bottom of said groove for forming said groove and inner periphery portion only to an upper-half portion and a lower-half portion.

8. A sintered oilless bearing as claimed in claim 7, wherein said groove of said upper-half portion and said groove of said lower-half portion are alternately positioned.

9. A sintered oilless bearing as claimed in claim 7, wherein said grooves of said upper-half portion and lower-half portion are formed to respectively number more than six.

10. A sintered bearing device having a hollow section therethrough for receiving a shaft, comprising:

a plurality of radial projections spaced apart from each other;

a plurality of grooves each disposed between two adjacent rachial projections wherein the following expression is satisfied:

$$\frac{\alpha}{\alpha+\beta} = 0.56\text{--}0.78$$

where $\alpha$ is an angle of one of the plurality of grooves and $\beta$ is an angle of one of the plurality of projections.

* * * * *